United States Patent [19]

Hedlund

[11] 4,239,075
[45] Dec. 16, 1980

[54] PROFILED TIRE TREAD

[76] Inventor: John A. Hedlund, 1300 Morrical Blvd., Findlay, Ohio 45840

[21] Appl. No.: 815,547

[22] Filed: Jul. 14, 1977

[51] Int. Cl.³ .................... B60C 11/00; B29H 17/37
[52] U.S. Cl. .................... 152/209 R; 156/96; 156/129; 428/167
[58] Field of Search ............... 152/185, 187, 188, 190, 152/209; 156/96, 127, 129; 428/167

[56] References Cited

U.S. PATENT DOCUMENTS

| 2,501,493 | 3/1950 | Beward | 156/129 X |
| 2,686,554 | 8/1954 | Hinman | 156/127 |
| 3,283,795 | 11/1966 | Schelkmann | 156/96 |
| 3,689,337 | 9/1972 | Schelkmann | 156/96 |
| 3,740,292 | 6/1973 | Leblond | 156/129 X |
| 3,753,821 | 8/1973 | Ragen | 156/96 |
| 3,815,651 | 6/1974 | Neal | 156/96 |
| 3,947,312 | 3/1976 | Henley | 156/127 X |
| 3,951,720 | 4/1976 | Brodie | 156/96 |
| 3,964,949 | 6/1976 | Kent et al. | 156/96 |

FOREIGN PATENT DOCUMENTS

| 222115 | 6/1959 | Australia | 156/96 |
| 562232 | 8/1958 | Canada | 156/96 |

Primary Examiner—John E. Kittle
Attorney, Agent, or Firm—DeLio and Montgomery

[57] ABSTRACT

A precured tire tread for use in retreading tires contoured to have a flat road-contacting tread surface when applied to the casing.

21 Claims, 4 Drawing Figures

U.S. Patent  Dec. 16, 1980  4,239,075
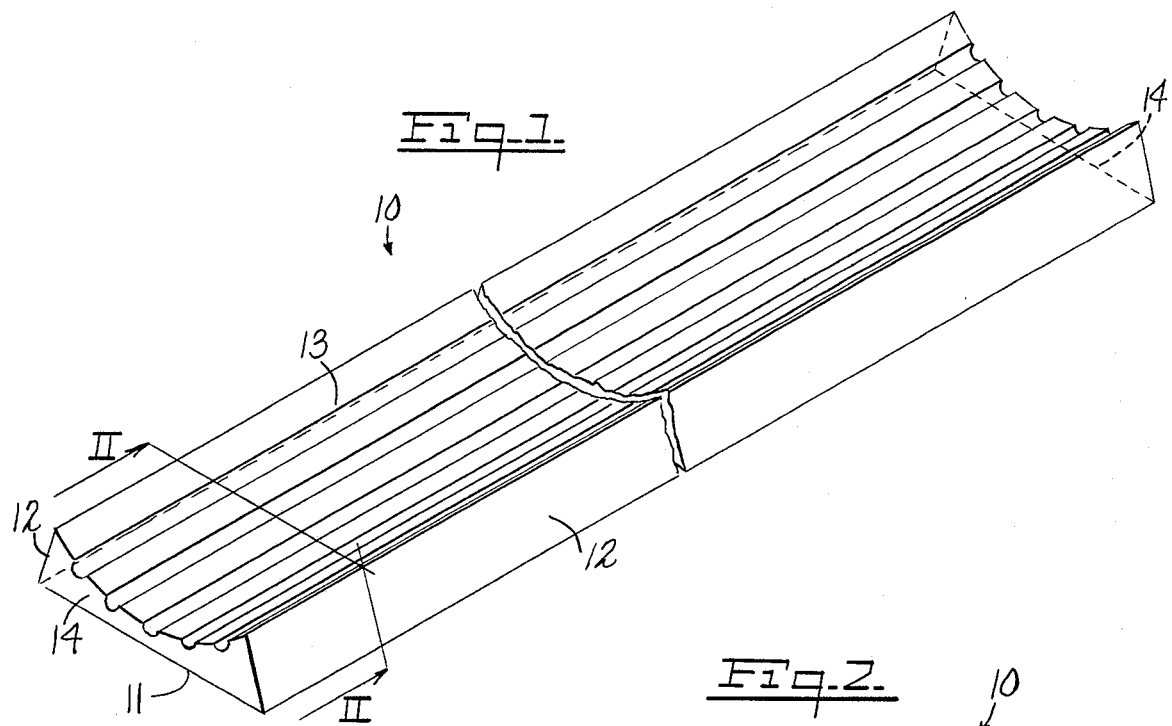
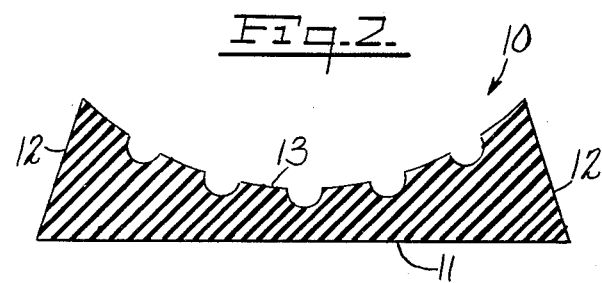
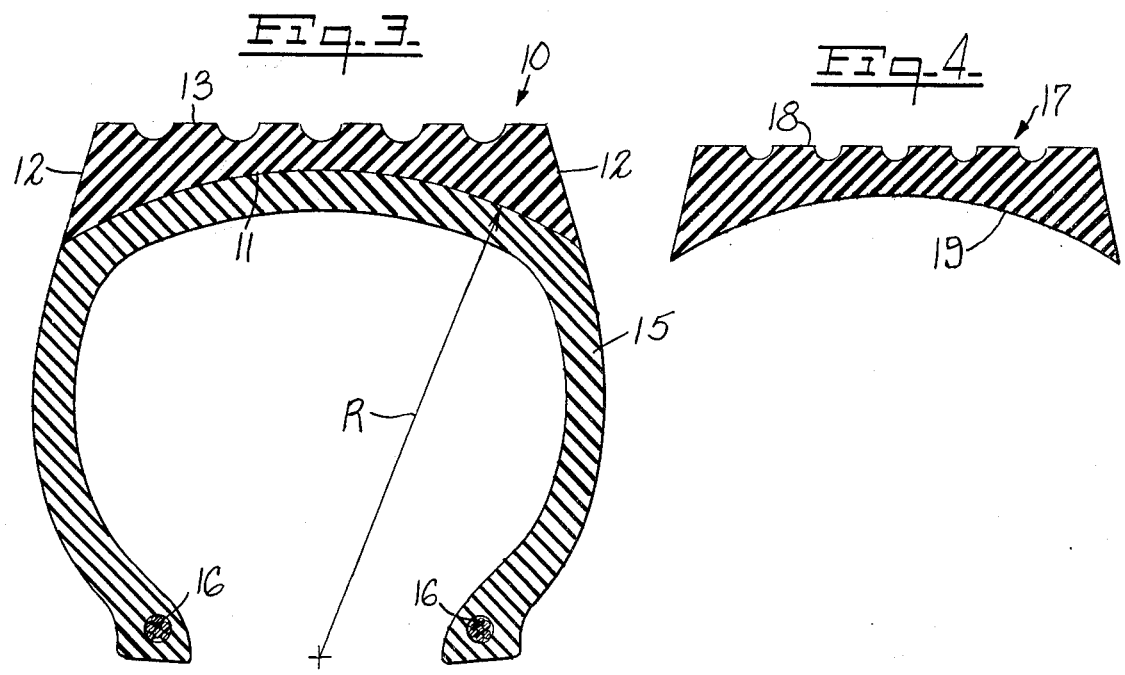

PROFILED TIRE TREAD

BACKGROUND OF THE INVENTION

1. Field of the Invention

This invention relates generally to the field of pneumatic tires and more specifically to precured treads used in retreading.

2. Description of the Prior Art

When retreading a tire, the old tire casing is buffed to remove remnants of the old tread and to remove dirt and other contamination to leave a clean surface to receive the new tread. The buffing generally leaves the casing with a curved profile on which the new tread is bound. In the prior art, the precured tread, and particularly the road-contacting surface thereof, when applied to the tire casing, assumes a curved profile similar to that of the underlying tire casing. In a tire having this profile, the center of the tread tends to wear out more quickly than the edges thereof. This is because the curved profile, in which the center is forced radially outwardly, results in the maximum tire force, and hence the maximum wear, being concentrated near the center, rather than across the entire tread face. A lessened force at the edges of the tread also results in the tire having a lower cornering ability than would be the case if the force were uniform across the tread face.

SUMMARY OF THE INVENTION

It is therefore an object of the invention to provide a new and improved precured tire tread for use in retreading used tires having a road-contacting surface with a preselected profile.

It is yet another object of the invention to provide a tire tread profiled so that the tread, when situated on a curved buffed tire casing, has a flat road-contacting surface.

In brief, the invention provides a precured tire tread for use in retreading molded to have a concave tread surface and a flat rear surface, the rear surface adapted to be bound to the buffed tire casing. The contour of the road contact surface and the rear surface is such that when the tread is applied to the casing, the road-contact surface is flat to the road. In a modification, the tread is molded having a flat tread surface and a rear surface concave to conform to the casing.

BRIEF DESCRIPTION OF THE DRAWINGS

The aforementioned objects and features of the hereindisclosed invention, as well as other objects and advantages thereof, will be better understood upon consideration of the following detailed description when read in conjunction with the drawings, in which:

FIG. 1 is a perspective view of the new tread;

FIG. 2 is a cross-section taken along lines II—II in FIG. 1;

FIG. 3 is a cross-section of the tread applied to a tire casing; and

FIG. 4 is a cross-section of a modification of the embodiment shown in FIG. 1.

DETAILED DESCRIPTION OF THE PREFERRED EMBODIMENT

With reference to the drawings, the invention provides an elongated precured tire tread 10 having a flat bonding surface 11, two side surfaces 12 and a concave contoured road contacting surface 13. Tread 10 further includes two butt ends 14, which may be skived so as to overlap when applied to the tire casing.

Road-contacting surface 13 includes a selected tread pattern formed in the face thereof. The concave contour of surface 13 is selected so that when tread 10 is attached to a tire casing as described hereinbelow, surface 13 will be flat.

With reference to FIG. 3, a cross-section of a tire casing 15 is shown with a tread 10, according to the invention, bonded thereto. The tire casing 15 may include a plurality of beads 16, and may have several plies and belts (not shown). In preparing to receive a new tread, casing 15 was buffed to a preselected profile. The tread 10 was then wrapped circumferentially around the casing with bonding surface 11 proximate thereto. The edges of side surfaces 12 are then drawn back around the casing so that surface 11 conforms to the rounded surface thereof. This draws the edges of road-contacting surface 13 back so that it is flat. Thus, when the tire is placed on the road, surface 13 will be flat against the road, and the road-contacting surface 13 will grip the tire uniformly across the face thereof.

Since the tread 10 is cured prior to its being applied to the tire casing 15, tread 10 will resist being curved around casing 15, which will tend to force the tread to attempt to flex back to its original concave configuration. This causes the edges of road-contacting surface 13 to be forced radially outwardly and the center therebetween to be forced inwardly. This results in the edges of the tread more firmly gripping the road than would otherwise be the case.

With reference to FIG. 4, a modification of the new tread provides a tread 17 having a flat road-contacting surface 18 and a concave rear bonding surface 19. Tread 17 is applied to a tire casing in the same manner as set forth with reference to FIG. 3. Rear surface 19 is profiled to conform to the casing without the necessity of drawing back the edges of the tread 17. Contacting surface 18 therefore retains its flat profile across the width thereof.

It will thus be seen that the objects set forth above, along with those made apparent from the preceding description, are efficiently attained. The invention provides a precured tire tread having a substantially flat road-contacting surface when attached to a tire and a uniform tire contact force across the entire face of the road-contacting surface. Since certain changes may be made in carrying out the invention without departing from the scope thereof, it is intended that all matter contained in the above description and shown in the accompanying drawings shall be interpreted as illustrative and not in a limiting sense.

What is claimed is:

1. A tire tread for retreading a tire casing, comprising, an elongated body portion of cured material having:
    a bonding surface adapted for bonding to a tire casing, and
    a road contacting surface adapted to engage a road, said road contacting surface being oppositely disposed and spaced apart from said bonding surface and being concave in transverse cross-sectional profile so as to resistingly assume a generally flat cross-sectional profile when said bonding surface is bonded to a tire casing.

2. The device of claim 3 further comprising a pair of oppositely disposed spaced apart side surfaces connecting said road contacting surface and said bonding surface wherein the thickness of said tire tread between said road contacting surface and said bonding surface increases in graduation from the longitudinal center of said tire tread to said side surfaces.

3. The device of claim 1 for retreading a tire casing having a curved transverse cross-sectional profile, comprising, said bonding surface being generally flat in transverse cross-sectional profile so as to resistingly assume a curve transverse cross-sectional profile when said bonding surface is bonded to a tire casing.

4. The device of claim 3 wherein said bonding surface assumes the curved transverse cross-sectional profile of a tire casing when said bonding surface is bonded directly to the tire casing.

5. The device of claim 3 wherein:

said bonding surface has a pair of oppositely disposed spaced apart longitudinal edges, said road contacting surface has a pair of oppositely disposed spaced apart longitudinal edges, and first and second oppositely disposed spaced apart side surfaces connect said respective longitudinal edges of said road contacting surface and said bonding surface with said first side surface extending from said bonding surface to said road contacting surface in inclined disposition toward said second side surface.

6. The device of claim 5 wherein said second side surface extends from said bonding surface to said road contacting surface in inclined disposition toward said first side surface.

7. The device of claim 3 for retreading a tire casing having a curved transverse cross-sectional profile of predetermined radius of curvature wherein:

said bonding surface resistingly assumes a curved cross-sectional profile of said predetermined radius of curvature when said bonding surface is bonded directly to a tire casing.

8. The device of claim 2 wherein said road contacting surface has a tread pattern formed therein.

9. In combination with a tire casing having a circumferential outer surface, a tire tread extending around said circumferential outer surface and comprising, an elongated body portion of cured material having, a bonding surface bonded to said circumferential outer surface, and a road contacting surface generally flat in transverse cross-sectional profile and tending to elastically assume a concave transverse cross-sectional profile, said road contacting surface being oppositely disposed and spaced apart from said bonding surface.

10. The combination of claim 9 wherein said tire casing has a curved cross-sectional profile and said bonding surface is generally curved in transverse cross-sectional profile and tends to elastically assume a generally flat cross-sectional profile.

11. The combination of claim 9 wherein:

said tire casing has a curved cross-sectional profile, said bonding surface has a pair of oppositely disposed spaced apart longitudinal edges, said road contacting surface has a pair of oppositely disposed spaced apart longitudinal edges, and first and second oppositely disposed spaced apart side surfaces connect said respective longitudinal edges of said road contacting surface and said bonding surface with said first side surface extending from said bonding surface to said road contact surface in inclined disposition toward said second side surface.

12. The combination of claim 11 wherein said second side surface extends from said bonding surface to said road contacting surface in inclined disposition toward said first side surface.

13. The combination of claim 9 wherein said road contacting surface comprises oppositely spaced apart edge portions elastically biased radially outward from said tire casing.

14. In combination with a tire casing having a circumferential outer surface, a tire tread extending around said circumferential outer surface and comprising, an elongated body portion of cured material having, a bonding surface bonded to said circumferential outer surface, and a road contacting surface oppositely disposed and spaced apart from said bonding surface, said road contacting surface having oppositely disposed longitudinal edge portions elastically biased radially outward from said tire casing.

15. A method for retreading a tire casing having a circumferential outer surface comprising, providing an elongated tire tread of cured material having a bonding surface, an oppositely disposed spaced apart road contacting surface of concave transverse cross-sectional profile, and oppositely disposed spaced apart side surfaces connecting said bonding surface and said road contacting surface, wrapping said elongated tire tread circumferentially around said tire casing so said bonding surface faces said circumferential outer surface, drawing said side surfaces around said casing so that said road contacting surface is generally flat in transverse cross-sectional profile, and bonding said tire tread to said casing.

16. The method of claim 15 wherein:

the step of drawing said side surfaces around said casing comprises drawing said side surfaces so that said bonding surface conforms to the outer surface of said casing, and the step of bonding comprises bonding said tire tread directly to said casing.

17. The method of claim 15 further comprising the step of:

preparing the circumferential outer surface of said tire casing to a preselected transverse cross-sectional profile.

18. The method of claim 15 wherein the step of:

drawing said side surfaces comprises drawing said side surfaces around said casing so that the longitudinal edge portions of said road contacting surface are elastically biased radially outward from said casing.

19. A method for retreading a tire casing having a circumferential outer surface, comprising, providing an elongated tire tread of cured material having a bonding surface, an oppositely disposed spaced apart road contacting surface with oppositely disposed longitudinal edge portions, and oppositely disposed spaced apart side surfaces connecting said bonding surface and said road contacting surface, wrapping said elongated tire tread circumferentially around said tire casing so said bonding surface faces said circumferential outer surface, drawing said side surfaces around said casing so that said longitudinal edge portions of said road contacting surface are elastically biased radially outward from said tire casing, and
bonding said tire tread to said tire casing.

20. The method of claim 19 wherein the step of: drawing said side surfaces further comprises drawing said side surfaces around said casing so that the longitudinal middle portion of said road contacting surface is elastically biased radially inward toward said tire casing.

21. The method of claim 19 wherein bonding comprises bonding said tire tread directly to said tire casing.

* * * * *

UNITED STATES PATENT AND TRADEMARK OFFICE
CERTIFICATE OF CORRECTION

PATENT NO. : 4,239,075
DATED : December 16, 1980
INVENTOR(S) : John A. Hedlund

It is certified that error appears in the above-identified patent and that said Letters Patent are hereby corrected as shown below:

In Claim 2, line 1 - "3" should be "1".

In Claim 8, line 1 - "2" should be "1".

Signed and Sealed this

Thirty-first Day of March 1981

[SEAL]

Attest:

RENE D. TEGTMEYER

Attesting Officer     Acting Commissioner of Patents and Trademarks